United States Patent Office.

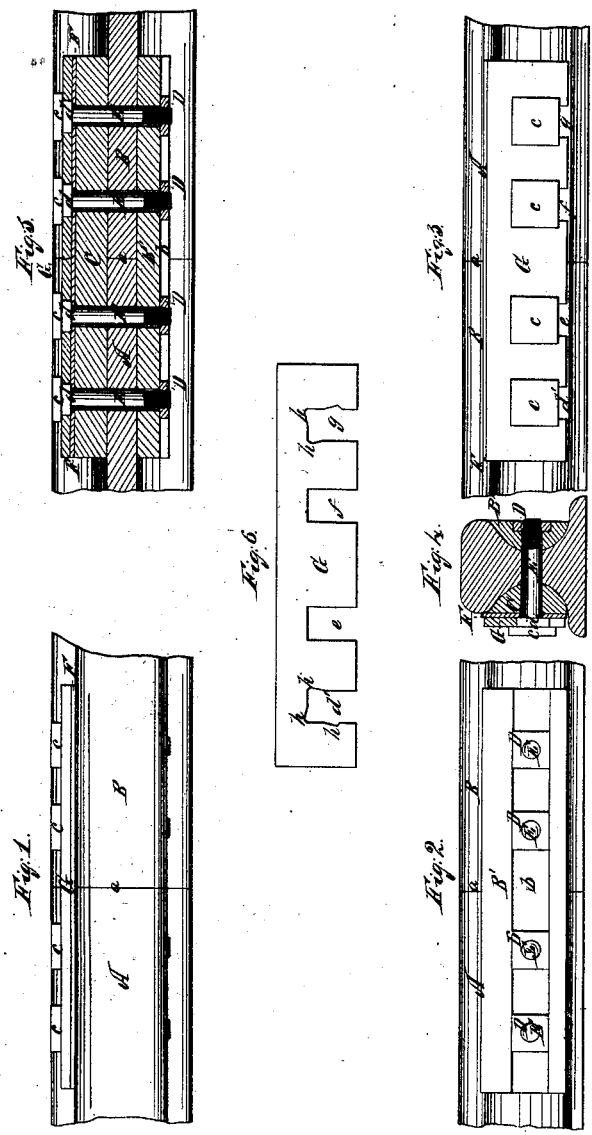

THOMAS WHITTEMORE, OF CAMBRIDGEPORT, MASSACHUSETTS.

Letters Patent No. 69,733, dated October 8, 1867.

IMPROVEMENT IN RAILWAYS.

The Schedule referred to in these Letters Patent and making part of the same.

TO ALL PERSONS TO WHOM THESE PRESENTS SHALL COME:

Be it known that I, THOMAS WHITTEMORE, of Cambridgeport, in the county of Middlesex, and State of Massachusetts, have invented a new and useful Improvement having Reference to Railways or the fished joints thereof; and do hereby declare the same to be fully described in the following specification, and represented in the accompanying drawings, of which—

Figure 1 is a top view.
Figures 2 and 3 side elevations.
Figure 4, a transverse and vertical section; and
Figure 5, a horizontal section of portions of two rails and their "fished joint" provided with my invention.
Figure 6 is a side view of the bolt-holder, to be hereinafter described.

The purpose of my invention is to prevent the screw-bolts and nuts of the joint-lap bars from becoming loosened or unscrewed by the jar and concussions of the railway carriages, while the latter may be running on the track.

In the drawings, A and B are end portions of two rails, arranged in line with each other. B' and C are the "fishings" or "lap bars," arranged against opposite sides of such rails, and each way from their joint a. The inner lap bar B' I make with a check groove, b, extending longitudinally through it, and of a depth and width to receive each of the several nuts D D D D of the screw-bolts E E E E, and prevent it from being revolved. The screw-thread of one or each of the bolts going through one of the rails is pitched in a direction opposite to that of either or each of the screws of the bolts which go through the other rail, and each bolt is provided with an auxiliary head, c, extending from and being larger in size than its main head d, as represented in the drawings. In case the outer "fishing" or lap bar C is made of wood, I prefer to use against it a plate, F, of metal for the main heads of the screw-bolts to abut against, the shanks of the bolts going through the plate, but when the bar C is made of metal there need be no such plate employed. A bolt-holder or plate, G, formed as shown in fig. 6, viz, with notches $d'$ $e$ $f$ $g$, to receive the main heads of the bolts, and enclose them on opposite sides, is to be slipped on the said heads and between the fishing and the auxiliary bolt-heads, the latter serving to retain the bolt-holder against the fishing or its face-plate. The external notches $d'$ $g$, instead of being rectangular like the internal ones $e$ $f$, are shaped as shown in fig. 6, so as to admit each of the exterior bolts, after application of the bolt-holder to them, to be turned a little into recesses $h$ $h$, and so as to prevent the bolt-holder from being lifted off the bolts. Preparatory to insertion of the bolts through the lap bars and rails, the nuts are placed within the holding groove of the inner lap bar, the bolts being subsequently screwed into the nuts.

I am aware of the device patented by Letters Patent No. 32,880, such being for preventing a nut from working loose upon its screw. This construction differs from my invention, as I make use of no ratchet-teeth, no springs nor pawls to prevent the nut from turning on the screw, but I arrange the nut in a groove in the lap bar, and so that the sides of the groove alone may operate to prevent the nut from being revolved.

In consequence of the two outer bolts having their screw-threads pitched in opposite directions, one being what is termed a "left" and the other a "right" screw, any tendency of the bolts to unscrew within their nuts will set their main heads firmer into the notches $h$ $h$, and thereby operate to prevent, with such notches, the bolt-holder from being raised out of place on the bolts.

I claim the bolt-holder as made with its external notches formed substantially as set forth.

I also claim in connection with the bolt-holder, having its external notches formed as described, the arrangement of the outer bolts with screws pitched in opposite directions, as explained.

I also claim the combination and arrangement of the auxiliary bolt-heads, with the bolts, bolt-holder, rails, and lap bars, the whole being as specified.

I also claim the combination of the bolt-holder, constructed as described, with the bolts, the rails, and the lap bars, as specified.

I also claim the arrangement of the check groove $b$ and the lap bar, the bolts and nuts, or the same and the holding-plate applied to the two rails, substantially as set forth.

THOMAS WHITTEMORE.

Witnesses:
R. H. EDDY,
F. P. HALE, Jr.